United States Patent [19]
Kato

[11] Patent Number: 5,148,342
[45] Date of Patent: Sep. 15, 1992

[54] MAGNETIC HEAD HAVING A FILLER PLATE ARRANGED BETWEEN TWO MAGNETIC CORE ASSEMBLIES

[75] Inventor: Minoru Kato, Chichibu, Japan

[73] Assignee: Canon Denshi Kabushiki Kaisha, Chichibu, Japan

[21] Appl. No.: 557,770

[22] Filed: Jul. 26, 1990

[30] Foreign Application Priority Data

Aug. 3, 1989 [JP] Japan .................. 1-200395

[51] Int. Cl.$^5$ .................. G11B 5/29; G11B 5/147
[52] U.S. Cl. .................. 360/121; 360/122; 360/126
[58] Field of Search .............. 360/121, 122, 118, 126, 360/129, 124

[56] References Cited

U.S. PATENT DOCUMENTS

4,713,709 12/1987 Yasuda et al. .................. 360/122 X
4,748,527 5/1988 Fujioka et al. .................. 360/121 X
4,750,071 6/1988 Kato .................. 360/118 X
4,972,336 11/1990 Reid et al. .................. 360/121 X

*Primary Examiner*—John H. Wolff
*Attorney, Agent, or Firm*—Spencer, Frank & Schneider

[57] ABSTRACT

A magnetic head comprises first and second front core assemblies and a filler plate. The first front core assembly is connected to a back core to form a magnetic core such as a recording/reproduction core or an elimination core. The second front core assembly, which is arranged parallel to the first front core assembly, is connected to a back core to form a magnetic core such as an elimination core. Between the first and second core assemblies is arranged a filler plate having a shape which substantially corresponds to the combined shape of both front core assemblies superimposed one on another. The filler plate is made of a non-magnetic ferrite or ceramics.

20 Claims, 8 Drawing Sheets

MAGNETIC HEAD HAVING A FILLER PLATE ARRANGED BETWEEN TWO MAGNETIC CORE ASSEMBLIES

BACKGROUND OF THE INVENTION

1. Field of the Invention

The present invention relates to a magnetic head and more particularly to a magnetic head which performs magnetic recording or reproduction of information to or from a magnetic disc used as a magnetic recording medium.

2. Description of the Prior Art

Figure 1:
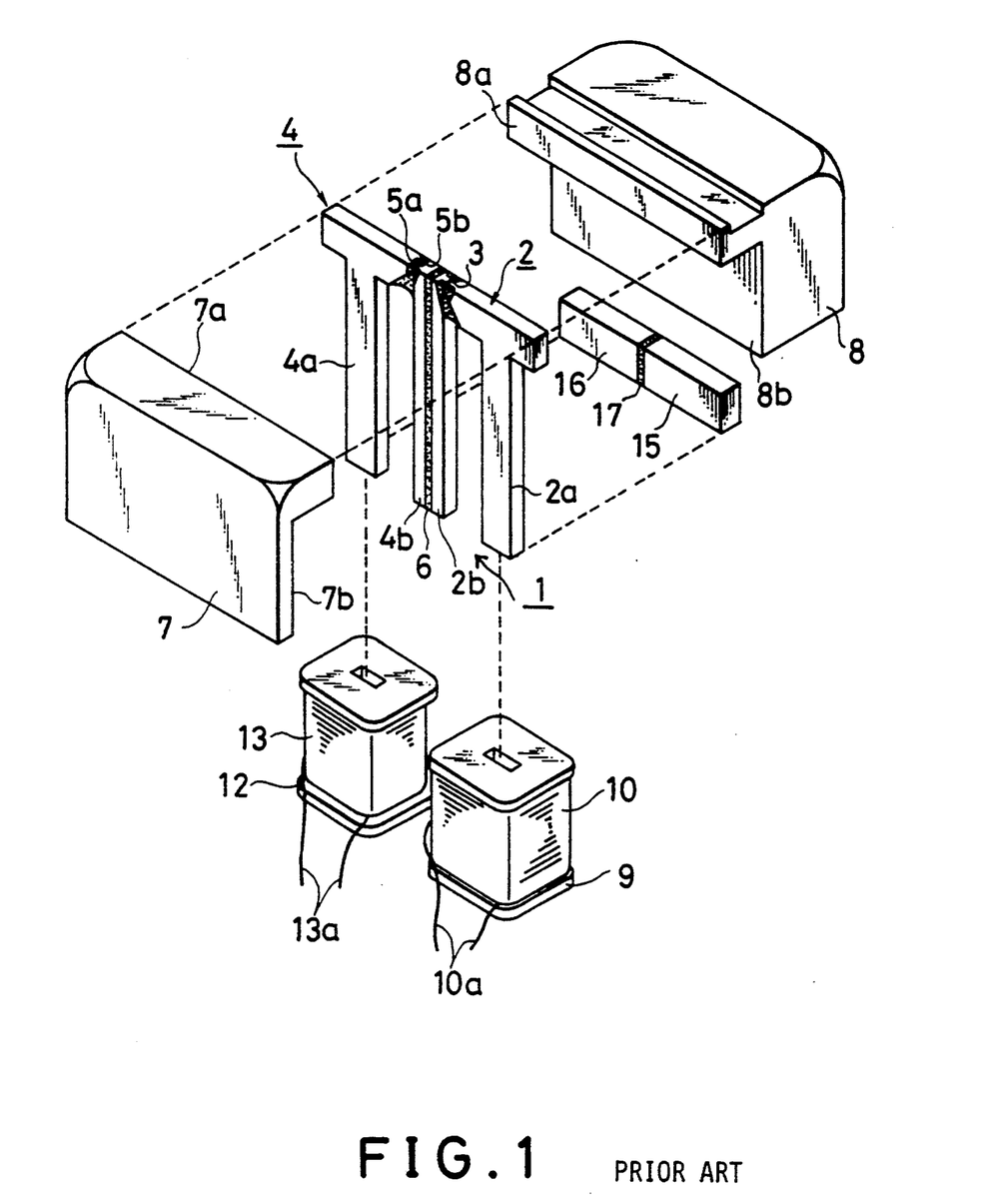
FIG. 1 is an exploded perspective view showing the construction of a magnetic head body.
Figure 2:
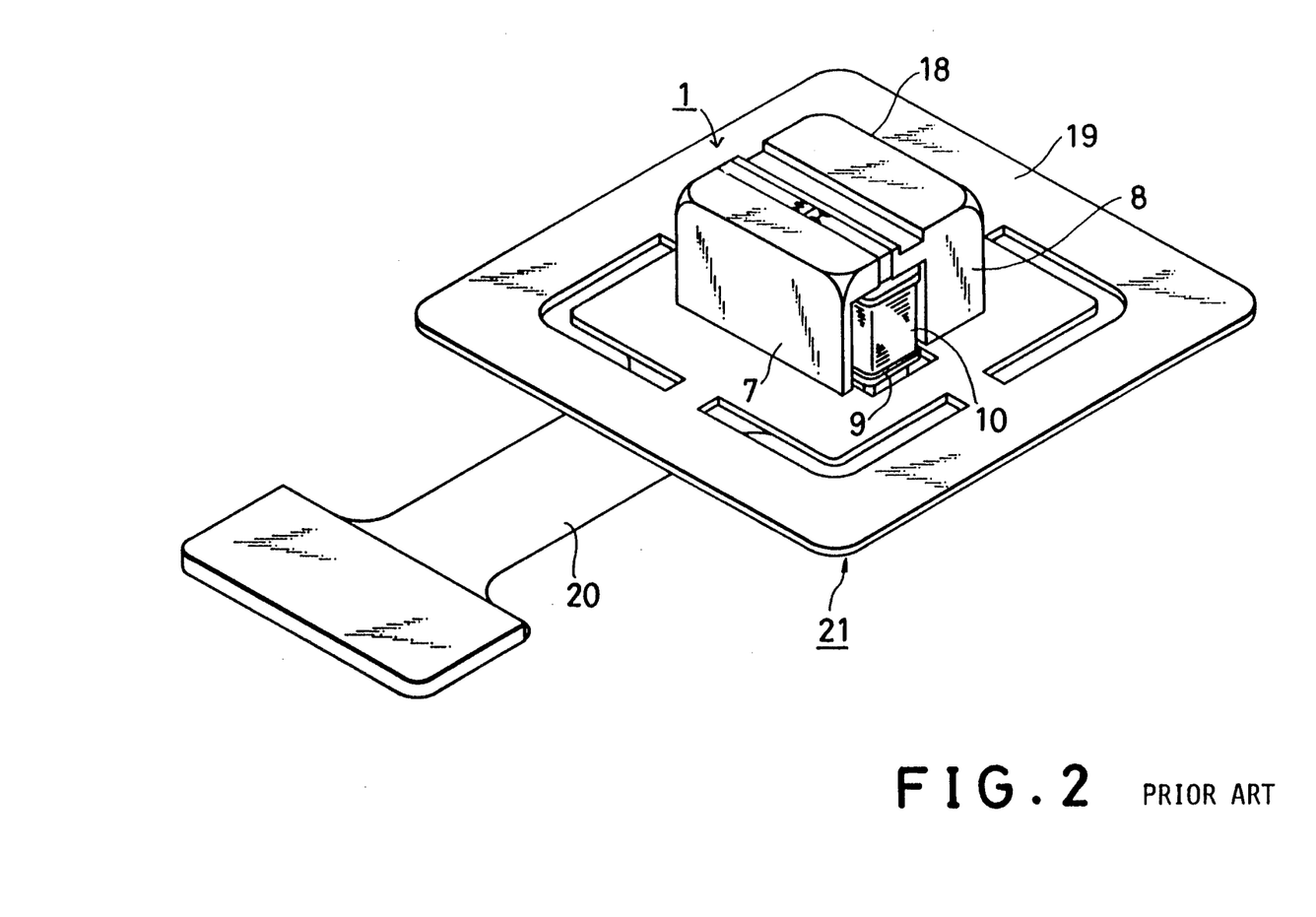
FIG. 2 is a perspective view showing the assembled state of the magnetic head shown in FIG. 1.
Figure 3:
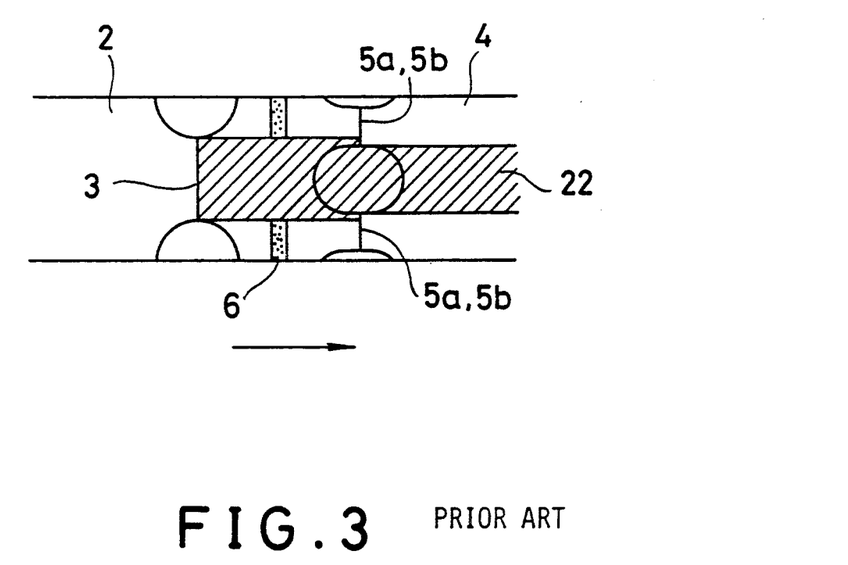
FIG. 3 is a schematic diagram illustrating a tunnel elimination system.

Referring to FIGS. 1 to 3, an explanation is provided of a magnetic head which performs magnetic recording or reproduction of information to or from a flexible magnetic disc, a floppy disc, by the so-called tunnel elimination method as an example of the above-described type magnetic head.

FIG. 1 illustrates the construction of a body of such a magnetic head. In FIG. 1, reference numeral 1 denotes a front core assembly hereinafter, abbreviated as a "core assembly"). The core assembly 1 is constructed as a combination of a magnetic core for recording and reproduction (hereafter, referred to as a "recording/reproduction core") and an elimination magnetic core 4 for performing tunnel elimination hereinafter, referred to as an "elimination core") with their respective front core portions being connected to each other via a spacer 6.

The recording/reproduction core 2 includes a T-shaped front core 2a and an I-shaped front core 2b connected to each other via a recording/reproduction gap 3, with each of the back ends of the front cores 2a and 2b being connected to a back core 15. The elimination core 4 includes a T-shaped front core 4a and an I-shaped front core 4b connected to each other via elimination gaps 5a and 5b, with each of the back ends of the front cores 4a and 4b being connected to a back core 16. In this case, the recording/reproduction core 2 and the elimination core 4 are connected to each other via the spacer 6 to form the core assembly 1 before the cores 2 and 4 are connected to their respective back cores 15 and 16, and sliders 7 and 8 are connected on both sides of the assembly core 1 by, for example, gluing, glass welding or the like.

The sliders 7 and 8 are made of ceramics or the like, and slidably contact a magnetic disc (not shown) together with both cores 2 and 4 to stabilize the slidable contact of both cores 2 and 4 onto the magnetic disc, thereby protecting the cores 2 and 4 from damage. The sliders 7 and 8 are blocks each having an L-shaped cross section and being formed with recesses 7b and 8b, on lower portions of their respective side surfaces opposite to the core assembly 1. The sliders 7 and 8 are connected to the core assembly 1 on their respective facing surfaces 7a and 8a, i.e., upper portions of their respective side surfaces opposite to the core assembly 1.

After the connection, a coil bobbin 9 on which a coil 10 for recording or reproduction is wound around and a coil bobbin 12 on which a coil 13 for elimination is wound around are fitted to the core assembly 1 so that the front cores 2a and 4a are inserted into respective cavities of the coil bobbins 9 and 12. Thereafter, the back cores 15, 16 connected to each other via a spacer 17 are connected to the back ends of the front cores 2a, 2b, 4a and 4b to construct the magnetic head body 18 shown in FIG. 2. As shown in FIG. 2, the magnetic head body 18 is fixed to a support plate 19 of stainless steel or a beryllium-copper alloy, which in turn is fixed to a flexible printed board 20, and coil ends 10a and 13a are connected to the flexible printed board 20, thus constructing a magnetic head 21.

The magnetic head 21 thus constructed is attached to a disc drive unit (not shown) by fixing the support plate 19 to a head carriage of the unit and is slidably contacted on the magnetic disc, with the upper surfaces of the core assembly 1, and of the sliders 7 and 8 (FIGS. 1 and 2) serving as a slidable contact surface. Recording is performed by the tunnel elimination type system shown in FIG. 2.

That is, in the tunnel elimination system, a data track 22 is formed by recording data to the magnetic disc slidably moving in a direction indicated by the arrow shown in FIG. 3 using the recording/regeneration gap 3 and then eliminating both sides of the data using the elimination gaps 5a and 5b, respectively.

Recently, however, development of higher capacity floppy disc units has been promoted and units which have a capacity of 10 MB or more have already been fabricated and put on the market. A higher capacity floppy disc unit can be attained by increasing the linear recording density and track density thereof. Floppy disc units having a capacity of from 1 to 2 MB now available on the market have a maximum linear recording density of 9.7 KBPI and a track density of 135 TPI. However, in order to obtain a capacity of 10 MB or more, it is necessary that the floppy disc units have a maximum linear recording density of 35 KBPI or more and a track density of 405 TPI or more. In other words, they must have both maximum linear recording density and track density by from 3 to 4 times as high as those now available.

Figure 4:
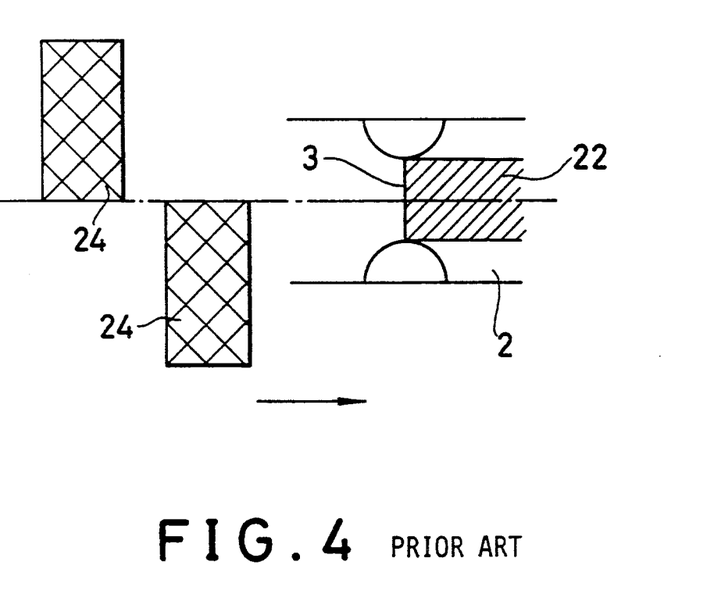
FIG. 4 is a schematic diagram illustrating a servo signal system.

In the case where the track density is to be increased, a servo signal type recording in which a servo signal has already been recorded in the magnetic disc is used in place of the tunnel elimination type recording using the magnetic head 21 as shown in FIGS. 1 and 2. FIG. 4 illustrates a situation in which recording to a magnetic disc is performed according to the servo signal type recording. In this case, the positioning of tracks is performed by a servo signal 24 which has been already recorded in the magnetic disc, and data are recorded using a magnetic head with only the recording/reproduction core 2 having only the recording/reproduction gap 3, thus forming a data track 22.

The above-described servo signal type recording is used for floppy disc units having a high track density as high as 200 TPI or more.

On the other hand, in general usage of floppy disc units, compatability must be assured between upper grade model units and lower grade model units so that their software and data are kept compatible. For example, 3.5 inch type products having a capacity of 2 MB have a 1 MB R/W compatibility (that is, they can read from or write to 1 MB floppy discs), and products having a capacity of 4 MB have a 1 MB and 2 MB R/W compatibility (that is, they can read from or write to both 1 MB floppy discs and 2 MB floppy discs). However, it is because the floppy discs have the same track density of 135 TPI that R/W compatibility is obtained. If the track density is different one from another, it is possible to read out from those floppy discs with lower track densities but not to write to them, thus failing to assure compatibility of data between floppy discs with different track densities.

Accordingly, in order to keep compatibility between floppy discs with different track densities, a composite type magnetic head has been proposed in which a tunnel elimination type magnetic core and a servo signal type magnetic core are arranged parallel or side by side in the direction of track width. FIGS. 5, 6, 7A and 7B illustrate the construction of such composite type magnetic head. In FIGS. 5, 6, 7A and 7B, those parts which are common with or correspond to those illustrated in FIGS. 1 and 2 are indicated by the same reference numerals, and explanation of the common parts is thus omitted here.

Figure 5:
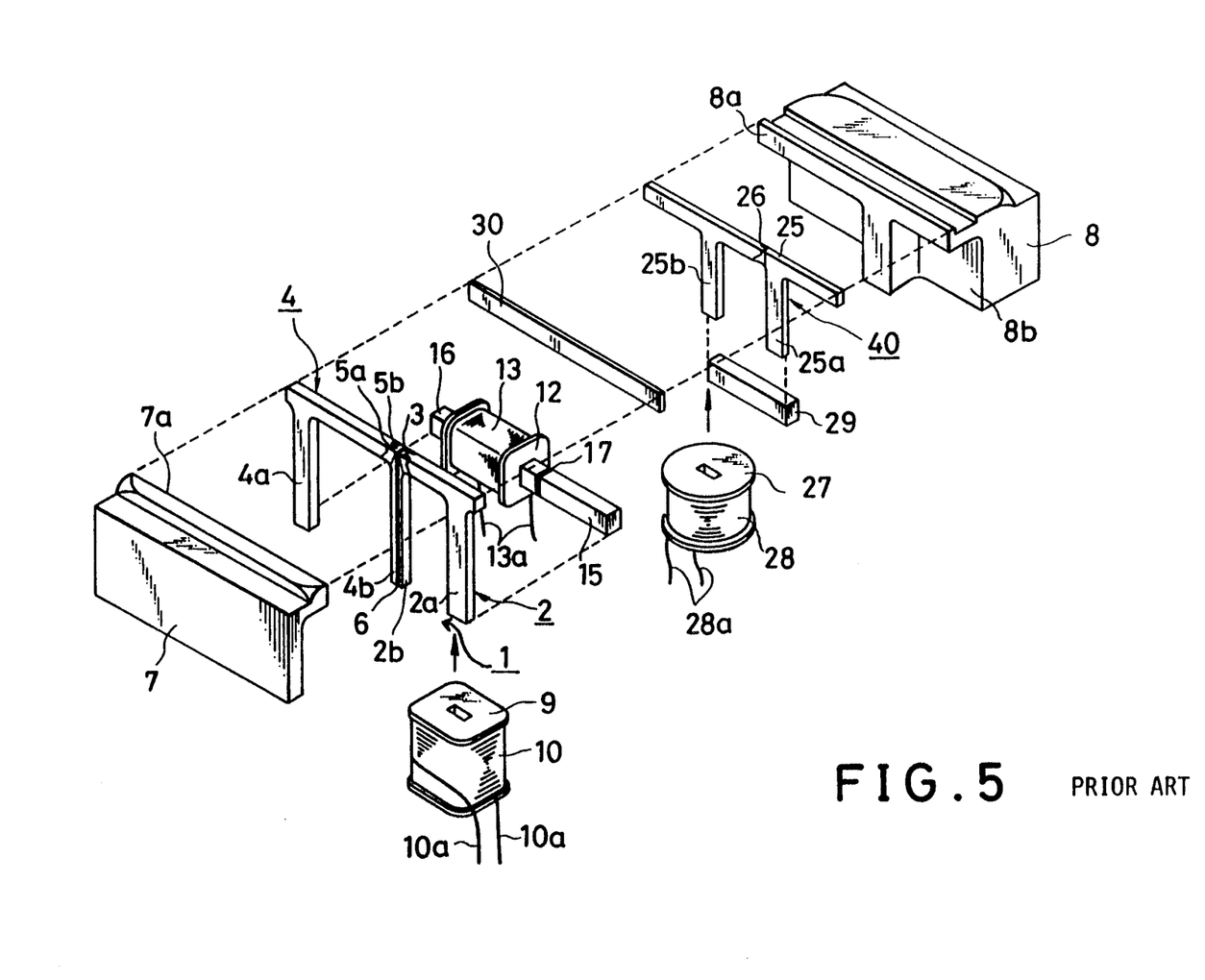
FIG. 5 is an exploded perspective view showing the construction of a composite type magnetic head body.
Figure 6:
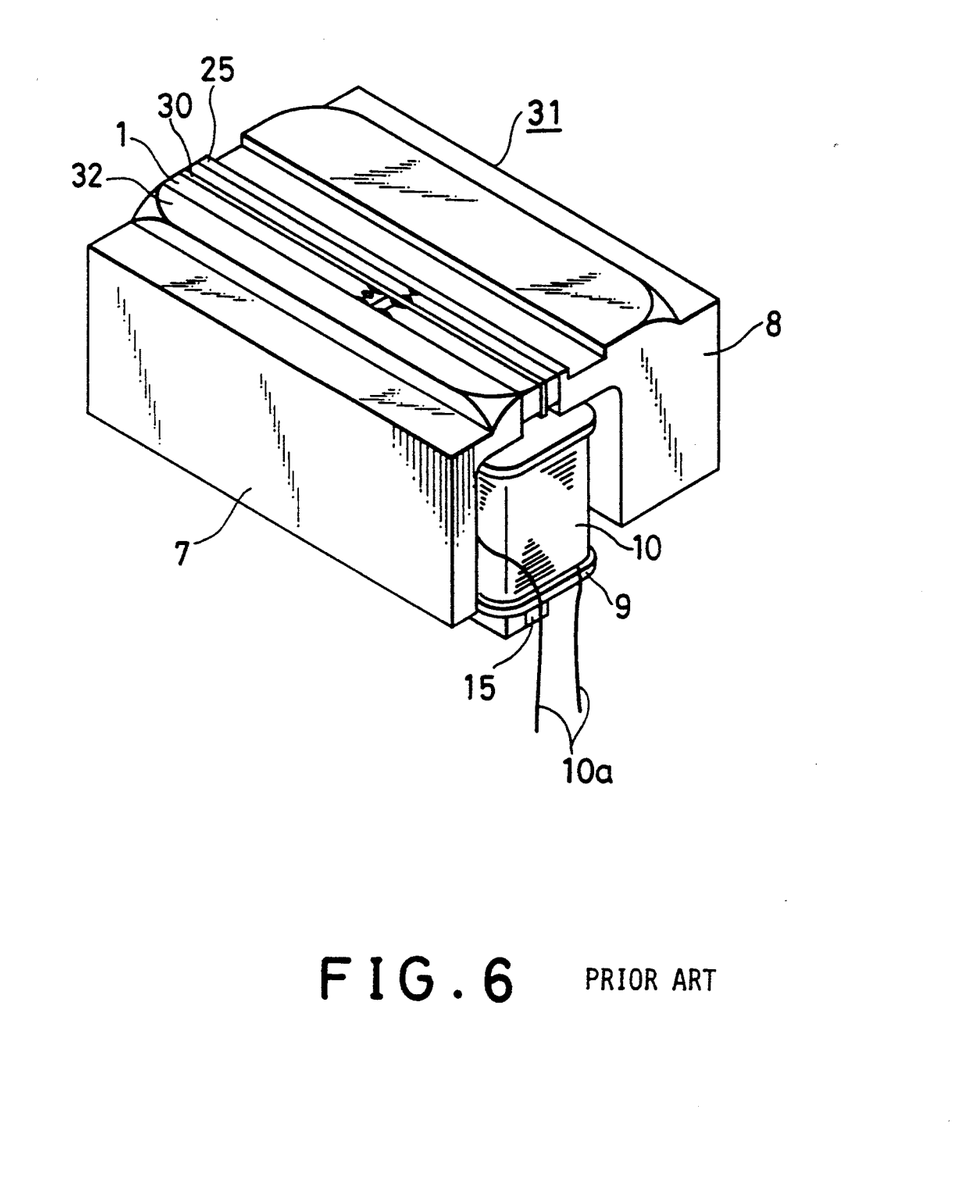
FIG. 6 is a perspective view showing the assembled state of the composite type magnetic head shown in FIG. 5.

FIG. 5 is an exploded perspective view of the magnetic head body.

In FIG. 5, the tunnel elimination type recording/reproduction core 2 and elimination core 4 are constructed by the core assembly 1 and the back cores substantially the same as those illustrated in FIGS. 1 and 2. Both cores 2 and 4 are constructed for a track density of 135 TPI, for example. Differences from those illustrated in FIGS. 1 and 2 are that the coil bobbin 12 of the elimination core 4 is engaged with the back core 16 in order to avoid a coil bobbin 27 for a recording/reproduction core 40 on which explanation will be made hereinbelow. To achieve this, the back core 16 is formed to be long and the front core 4a is substantially L-shaped.

On the other hand, reference numeral 40 denotes a servo signal type recording/reproduction core, which is constructed so as to be useful for floppy disks having a high track density (for example, 405 TPI or 540 TPI). The recording/reproduction core 40 has a back core 29 connected to a lower end portion of a core assembly 25 as illustrated in FIG. 5. The core assembly 25 includes an L-shaped front core 25a and a T-shaped front core 25b connected to the L-shaped front core 25a via a recording/reproduction gap 26. The front core 25b is inserted into the bobbin 27 around which a coil 28 is wound.

In assembling the magnetic head body, at first the core assemblies 1 and 25 are bonded to each other with an adhesive via a filler plate 30 made of non-magnetic ferrite or ceramics. The filler plate 30 has the shape of a slender rectangle in accordance with the facing surfaces on the upper ends of the respective side surfaces of the core assemblies 1 and 25.

Figure 7A:
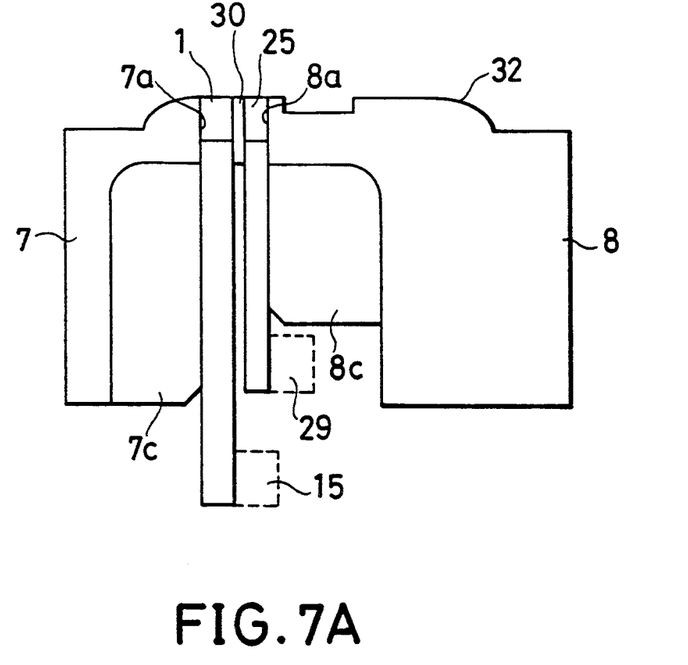
FIG. 7A is a side elevational view showing the composite type magnetic head body shown in FIG. 5, in which the core assemblies and sliders are connected to each other.
Figure 7B:
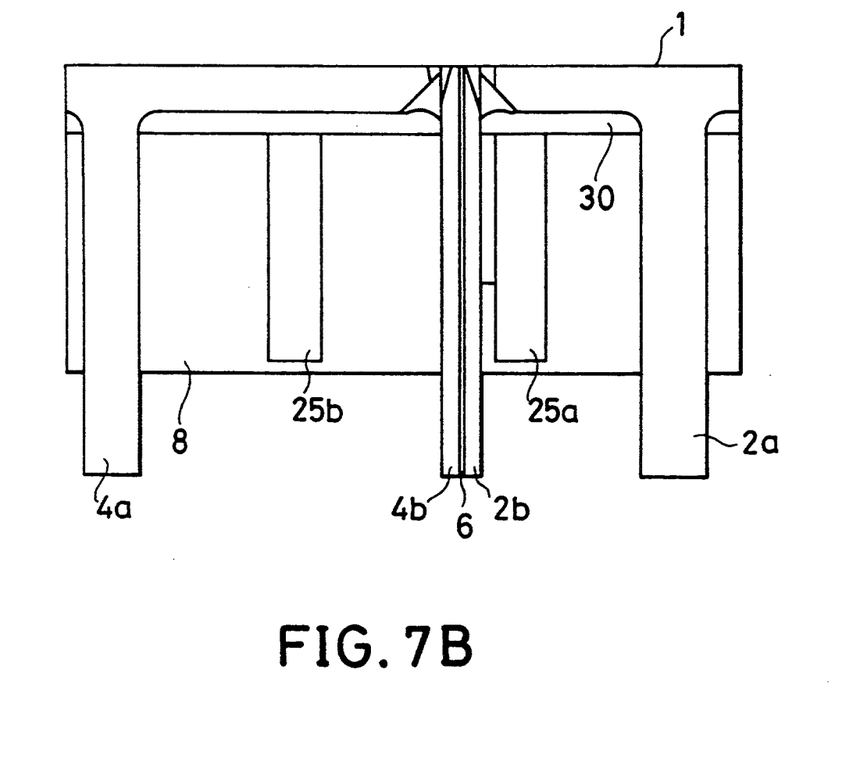
FIG. 7B is a front elevational view showing the magnetic head body shown in FIG. 5, in which only one of the sliders is connected to the core assemblies.

Next, the sliders 7 and 8 are connected on both sides of the core assemblies 1 and 25. FIG. 7A illustrates the side surface in the above-described condition. FIG. 7B illustrates a frontal view of the core assemblies to which only the slider 8 is connected.

Then, after engaging the coil bobbins 9 and 27 with the respective front cores 2a and 25b, the coil bobbin 12 is engaged with the back core portion 16 in the assembly composed of the back cores 15 and 16 connected to each other via the spacer 17 and then the back cores 15 and 16 are connected to the front cores 2a and 2b, and 4a and 4b, respectively. The back core 29 is connected to both of the front cores 25a and 25b. Thus, a magnetic head body 31 is constructed.

Upon performing recording/reproduction of a magnetic disc unit (not shown) using the magnetic head body 31 having the above-described construction, R/W compatibility is possible between upper grade model disc units and lower grade model disc units by using one core appropriately selected from the cores 2, 4 and 40 even when the track density is different from one floppy disc to another.

However, in the construction of the above-described composite type magnetic head, as will be clearly understood from FIG. 7B, the filler plate 30 of a slender rectangle is connected only on the respective side surfaces of the upper ends of the core assemblies 1 and 25, and the area of connection between the core assemblies 1 and 25 and the filler plate 30 is small. Therefore, the connection strength between the core assemblies 1 and 25 and the filler plate 30 is low. As a result the magnetic head body 31 tends to be broken upon processing the slidable contact surface 32 of the magnetic head body 31 for contacting the magnetic disc, or there tends to occur a difference in height between the core assemblies 1 and 25 and the sliders 7 and 8 or the filler plate 30 upon assembling the magnetic head body. This causes problems in that the characteristics of the magnetic head are deteriorated and yield is decreased.

SUMMARY OF THE INVENTION

It is an object of the present invention to provide a magnetic head in which the area of connection between core assemblies and a filler plate is large.

Accordingly, the present invention provides a magnetic head comprising a first front core assembly constituting at least two magnetic cores together with back cores connected to the first front core assembly. A second front core assembly constitutes a magnetic core together with a back core connected to the second front core assembly. The second front core assembly is arranged parallel to the first front core assembly. A filler plate has a shape which substantially corresponds to a combined shape of the first and second front core assemblies superimposed one on another. The filler plate is arranged between the first and second front core assemblies.

According to the present invention, the connection area between the filler plate and the front core assembly is large and therefore the connection strength between them is high. Therefore, problems such as the occurrence of differences in height in the slidable contact surface of recording medium, breakage of magnetic heads or the like due to lack of the connection strength at the time of assembling the magnetic heads and of the processing the slidable contact surface of the recording medium can be solved, and improvement of the quality of the magnetic heads and cost reduction due to improvement of yield can be achieved.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

First Embodiment

Figure 8:
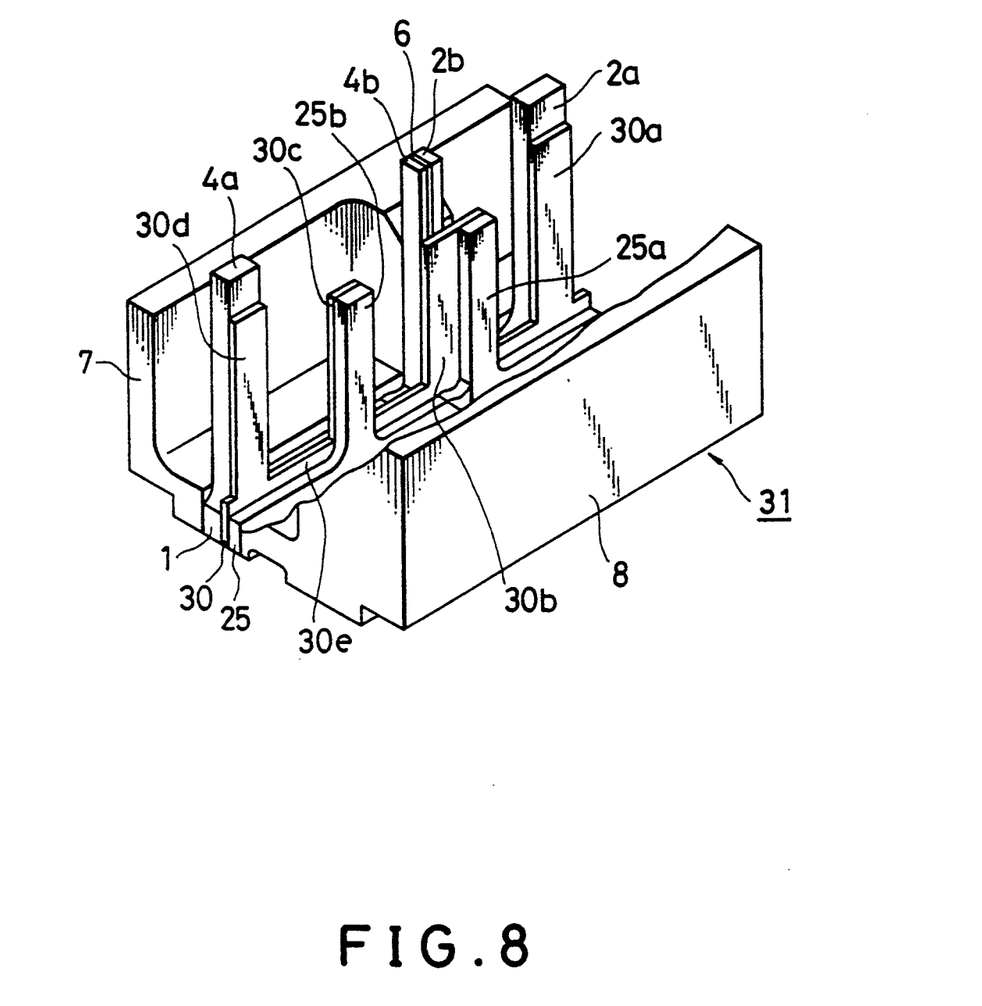
FIG. 8 is a perspective view showing a main part of a magnetic head according to an embodiment of the present invention.
Figure 9:
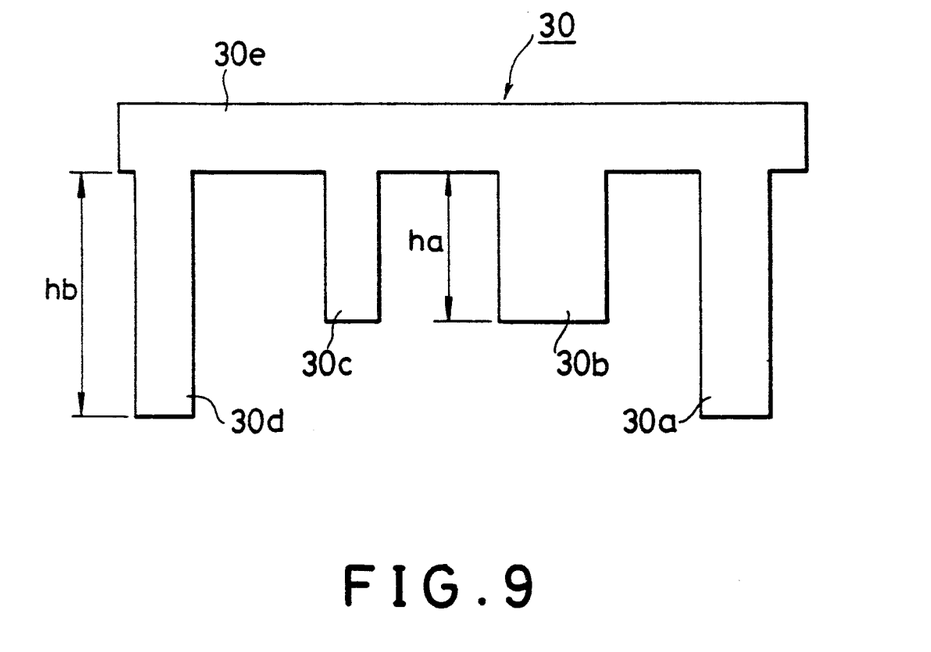
FIG. 9 is a front elevational view showing the shape of the filler plate shown in FIG. 8.

FIGS. 8 and 9 illustrate the construction of a main body of a composite type magnetic head for a floppy disc unit according to the first embodiment of the present invention. FIG. 8 illustrates a state in which the back core and the coil bobbin are removed from the magnetic head body. FIG. 9 illustrates the shape of the filler plate shown in FIG. 8. In FIGS. 8 and 9, those parts which are common with or correspond to those illustrated in FIGS. 5, 6, 7A and 7B are indicated by the same reference numerals, and explanation on the common parts is thus omitted here.

As illustrated in FIGS. 8 and 9, in this embodiment, the filler plate 30 which is connected to and sandwiched by the core assemblies 1 and 25, which have first and second planar surfaces respectively, is planar and has a shape different from that of conventional filler plates.

The filler plate 30 has a comb-like shape and includes an end portion 30e having a shape which corresponds to the side surfaces of the lower portions of the core assemblies 1 and 25 on which surfaces the core assemblies 1 and 25 are connected to the filler plate 30 as shown in FIG. 8, and four leg portions 30a, 30b, 30c and 30d which are vertical to the end portion 30e. The leg portions 30a to 30d are formed at positions corresponding to the positions of the vertical leg portions of the respective front cores in the core assemblies 1 and 25, and each has a rectangular shape having a width which corresponds to that of the side surface or side surfaces of one or more of the leg portions of the front cores on which one or more of the leg portions of the cores are connected to the filler plate 30. More specifically, the leg portion 30a corresponds to the leg portion of the front core 2a. The leg portion 30b corresponds to the leg portions of the front cores 2b, 4b and 25a. The leg portions 30c and 30d correspond to the leg portions of the front cores 25b and 4a, respectively.

The leg portions 30b and 30c have the same length $h_a$ which is equal to that of the leg portions of the front cores 25a and 25b. The leg portions 30a and 30d have the same length $h_b$ which differs depending on the direction in which the back cores 15 and 16 are attached. In the case where the back cores 15 and 16 are attached in the same direction as the back core 29 as shown in FIG. 7A (i.e., from right hand side in FIG. 7A), the length $h_b$ is determined to be the length of the front cores 2a, 4a and 4b minus the length of a space for the attachment of the back cores. On the other hand, if the back cores 15 and 16 are attached in a direction opposite to that in which the back core 29 is attached, the length $h_b$ is determined to be the same as the length of the leg portions of the front cores 2a, 4a and 4b.

In summary, the shape of the filler plate 30 substantially corresponds to a combined shape of the front core assemblies superimposed one on another. The parts other than the filler plate 30 of the magnetic head according to this embodiment are common with those of the composite type magnetic head illustrated in FIGS. 5, 6, 7A and 7B.

In the assembling steps for assembling the magnetic head body according to this embodiment using the above-described filler plate 30, at first core assemblies 1 and 25 are connected to each other by an adhesion bond via the filler plate 30 sandwiched therebetween as illustrated in FIG. 8. The leg portions 30a, 30c and 30d are connected to the leg portions of the front cores 2a, 25b and 4a, respectively. The leg portion 30b is connected to the leg portions of the front cores 2b, 4b and 25a.

Then, as illustrated in FIG. 8, the sliders 7 and 8 are connected to both sides of the core assemblies 1 and 25 by an adhesion bond, the coil bobbins, which are not illustrated in FIG. 8, are engaged with the corresponding leg portions and the back cores are connected to the core assemblies in the same manner as illustrated in FIGS. 5, 6, 7A and 7B, thereby constituting the magnetic head body 31.

According to the construction of the magnetic head according to this embodiment, because of the shape of the filler plate 30 illustrated in FIGS. 8 and 9 the area of connection between the core assemblies 1 and 25 and the filler plate 30 is much larger than that of the filler plate 30 illustrated in FIG. 7B. Therefore, the connection strength between the core assemblies 1 and 25 and the filler plate 30 can be increased to a greater extent. As a result, problems such as the breakage of the slidable contact surface of the magnetic head during processing or assembling the magnetic head and the occurrence of difference in height can be solved, thereby increasing the quality of the magnetic heads and increasing the yield to achieve cost reduction.

Second Embodiment

Figure 10:
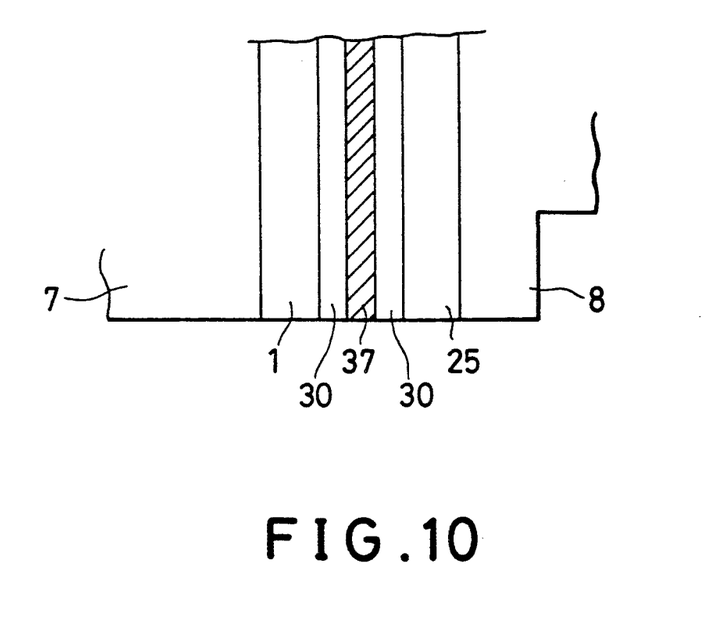
FIG. 10 is an enlarged view showing the main part of a magnetic head according to another embodiment of the present invention with parts broken away.

With the construction of the magnetic head according to the above-described first embodiment, there is a possibility that cross talk occurs because the core assemblies 1 and 25 are close to each other. In order to avoid this defect, the above-described filler plate 30 is used together with a shield plate 37 made of a magnetic material as illustrated in FIG. 10 as the second embodiment of the present invention. The shield plate 37 has the same shape as the filler plate 30. In this case, two filler plates 30 are used to sandwich the shield plate 37 and the plates are connected to each other to form a laminate. The resulting laminate is sandwiched by the core assemblies 1 and 25 and connected thereto, and then the sliders are connected on both sides thereof.

With this construction, cross talk through the shield plate 37 is prevented. The filler plate 30 and the shield plate 37 can be connected to each other with sufficient strength because the shield plate 37 has the same shape as the filler plate 30. The connection strength of the core assemblies 1 and 25 via the filler plate 30 and the shield plate 37 is less deteriorated as compared with the first embodiment.

The invention has been described in detail with respect to embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A magnetic head, comprising:
   (a) a first front core assembly having a first planar surface having a first shape, said first front core assembly including at least two magnetic cores;
   (b) first back core means connected to said first front core assembly;
   (c) a second front core assembly having a second planar surface, the shape of said second front core assembly being different from the shape of said first front core assembly, said second front core assembly being arranged parallel to said first front core assembly;
   (d) second back core means connected to said second front core assembly, said second front core assembly and said second back core means constituting a recording/reproduction magnetic core; and
   (e) a planar filler plate having a shape which substantially corresponds to and is coextensive with the combined shape of said first and second planar surfaces superimposed on each other, said filler plate being interposed between said first and second front core assemblies so as to be aligned in parallel therewith, whereby the coextensive connecting area between the filler plate and two core assemblies provides a more extensive bonding surface.

2. A magnetic head as claimed in claim 1 which further comprises a planar magnetic shield plate having substantially the same shape as said filler plate, said shield plate being laminated to said filler plate.

3. A magnetic head as claimed in claim 2 which comprises a further planar filler plate, said magnetic shield plate being interposed between the two filler plates.

4. A magnetic head as claimed in claim 1, wherein at least one of said at least two magnetic cores comprising said first front core assembly includes a T-shaped front core and an I-shaped front core connected to said T-shaped front core through a first gap, said T-shaped front core including a slidable portion for extending along a slidable contact surface of a recording medium and a leg portion extending perpendicular to said slidable portion, said slidable portion extending from both sides of said leg portion.

5. A magnetic head as claimed in claim 1, wherein at least one of said at least two magnetic cores comprising said first front core assembly includes an L-shaped front core and and I-shaped front core connected to said L-shaped front core through a second gap, said L-shaped front core including a first slidable portion extending along a slidable contact surface of a recording medium and a leg portion extending perpendicular to said first slidable portion, said first slidable portion of said L-shaped front core extending from only one side of the leg portion of said L-shaped front core.

6. A magnetic head as claimed in claim 2, wherein said second front core assembly includes an L-shaped front core and a T-shaped front core connected to said L-shaped front core through a third gap, said L-shaped and T-shaped front cores including a second slidable portion extending along said slidable contact surface of said recording medium and leg portions extending perpendicular to said second slidable portion, the second slidable portion of said L-shaped front core extending from only one side of the leg portion of said L-shaped front core and from both sides of the leg portion of said T-shaped front core.

7. A magnetic head as claimed in claim 6 wherein said first and second front core assemblies are arranged such that said second and third gaps are parallel to each other.

8. A magnetic head as claimed in claim 4, wherein said front core assembly consists of only two magnetic cores, and wherein a spacer is interposed between said only two magnetic cores.

9. A magnetic head, comprising:
   (a) A first magnetic core assembly having a first core part with a first planar surface;
   (b) a second magnetic core assembly having a second core part with a second planar surface arranged parallel to said first core part, said second planar surface having a shape which is different from the shape of said first planar surface; and
   (c) a first planar filler plate having a shape corresponding to and is coextensive with, both of said first and second planar surfaces, said filler plate being interposed between said first and second core parts so as to be aligned parallel to said first and second core parts whereby the coextensive connecting area between the filler plate and two core parts provide a more extensive bonding surface.

10. A magnetic head as claimed in claim 9, wherein said first core part has a first slidable portion aligned to a slidable contact surface of a recording medium and first, second and third leg portions extending perpendicular to said first slidable portion, and said second core part has a second slidable portion aligned to said slidable contact surface of said recording medium opposite said first slidable portion and first and second leg portions extending perpendicular to said second slidable portion.

11. A magnetic head as claimed in claim 10, wherein said filler plate includes a first portion interposed between said first and second slidable portions of said first and second core parts, second and third portions opposite the first and second leg portions of said first core part, a fourth portion interposed between the third leg portion of said first core part and the first leg portion of said second core part, and a fifth portion opposite the second leg portion of said second core part.

12. A magnetic head as claimed in claim 11, wherein each portion of said filler plate has a rectangular shape, and wherein the fourth portion of said filler plate has a width corresponding to that of the surface of the third leg portion of said first core part and the first leg portion of said second core part.

13. A magnetic head as claimed in claim 12, wherein the second portion of said filler plate has a length which is equal to that of the third portion of said filler plate.

14. A magnetic head as claimed in claim 13 wherein the lengths of the second and third portions of said filler plate are less than the lengths of the first and second leg portions of said first core part respectively.

15. A magnetic head as claimed in claim 14, wherein the lengths of the second and third portions of said filler plate are longer than the lengths of the fourth and fifth portions of said filler plate.

16. A magnetic head as claimed in claim 12, wherein the fourth portion of said filler plate has a length which is equal to that of the fifth-portion of said filler plate.

17. A magnetic head as claimed in claim 16 wherein the lengths of the fourth and fifths portions of said filler plate are substantially equal to that of said first and second leg portions of said second core part respectively, and less that the length of the third leg portion of said first core part.

18. A magnetic head as claimed in claim 9, wherein a shield plate made of a magnetic material and having the same shape as said filler plate is interposed with said filler plate between said first and second core parts.

19. A magnetic head as claimed in claim 9, which further comprises a second planar filler plate having a shape corresponding to that of said first filler plate, and a shield plate interposed between said first and second filler plates.

20. A magnetic head as claimed in claim 19, wherein said second filler plate is associated with said first filler plate and said shield plate, and said three plates are arranged between said first and second core parts so as to be aligned parallel to said first and second core parts.

* * * * *